United States Patent [19]

Shibayama

[11] Patent Number: 5,029,004
[45] Date of Patent: Jul. 2, 1991

[54] EDGE ENHANCEMENT APPARATUS USEFUL WITH LIQUID CRYSTAL DISPLAYS

[75] Inventor: Kenji Shibayama, Tokyo, Japan

[73] Assignee: Victor Company of Japan, Ltd., Yokohama, Japan

[21] Appl. No.: 586,212

[22] Filed: Sep. 21, 1990

[30] Foreign Application Priority Data

Sep. 22, 1989 [JP] Japan .................................. 1-247450
Sep. 25, 1989 [JP] Japan .................................. 1-248907

[51] Int. Cl.$^5$ ............................................. H04N 5/66
[52] U.S. Cl. ...................................... 358/162; 358/166; 358/236
[58] Field of Search ........................ 358/162, 166, 236; 340/784

[56] References Cited

U.S. PATENT DOCUMENTS 4,654,709  3/1987  Umezawa .......................... 358/162 X
4,908,710  3/1990  Wakai et al. ......................... 358/236

FOREIGN PATENT DOCUMENTS 63-280581  11/1988  Japan .
1-90680   4/1989  Japan .

*Primary Examiner*—James J. Groody
*Assistant Examiner*—Mark R. Powell
*Attorney, Agent, or Firm*—Pollock, VandeSande & Priddy

[57] ABSTRACT

An edge enhancement apparatus comprises an edge detection circuit including differentiators responsive to a video signal and a PLL responsive to a H SYNC for producing a clock for displaying the video signal on a display, for example, a LCD. The PLL further includes an adder between a LPF and VCO thereof for adding an output of the differentiator to an output of the LPF to frequency-modulate the clock for edge enhancement such that when the video signal transits from a shadow to highlight levels at an edge of an image, the clock frequency is increased at the shadow level and is decreased at highlight level. In the display supplied with the frequency-modulated clock and the video signal, a distance between a pixel indicating a shadow level and another pixel showing the high-light level at the edge portion is decreased, so that the video signal is edge-enhanced. In the second apparatus, the clock is frequency-modulated at the edge such that the frequency is increased, then decreased, finally increased. Other apparatus further includes a memory for storing a video signal as a buffer storage in response to the clock to produce a edge-enhanced video signal therein in addition to the first or second apparatus.

11 Claims, 7 Drawing Sheets

EDGE ENHANCEMENT APPARATUS USEFUL WITH LIQUID CRYSTAL DISPLAYS

BACKGROUND OF THE INVENTION

1. Field of the Invention

This invention relates to an edge enhancement apparatus for a video signal.

2. Description of the Prior Art

An edge enhancement apparatus for a liquid crystal display (LCD) has been known, which enhances an input video signal in level at edge portions to improve response or increase sharpness.

FIG. 7 is a block diagram of a prior art edge enhancement apparatus for a video signal for a liquid crystal display. FIG. 8 shows waveforms at each output point of the prior art edge enhancement apparatus. In FIG. 7, an input video signal is sifted in phase by two delay circuits 3 and 4 and then an edge enhancement signal Sd" is obtained at a subtractor 25. Such circuit is also known as a cosine filter. The edge enhancement signal Sd" is added to the input video signal to obtain edge enhanced video signal which is supplied to a liquid crystal display. Such edge enhancement apparatus of a prior art enhances the video signal at edge portions. However, there is a problem that picture quality is deteriorated at edge portions because a unnatural highlight and dark lines are developed near a outline of a picture image. This is because this prior art edge enhancement apparatus develops undershoot and overshoot at an edge portion, as shown by an waveform of Se". Further, in the liquid crystal display, the prior art edge enhancement apparatus does not provide the practical effect sufficiently in edge enhancement because generally, a dynamic rage of the LCD cannot be expected to be large and thus, undershoot and overshoot does not contribute edge enhancement sufficiently.

SUMMARY OF THE INVENTION

The present invention has been developed in order to remove the above-described drawbacks inherent to the conventional edge enhancement apparatus.

According to the present invention there is provided a first edge enhancement apparatus for a video signal, comprising: a edge signal producing circuit responsive to an input video signal for producing a first pulse of a given polarity having a first interval and then, a second pulse of the other polarity having a second interval in response to a leading edge of the input video signal and for producing a third pulse of the given polarity having a third interval and then, a fourth pulse of the other polarity having a fourth interval in response to a trailing edge of the input video signal such that magnitude of each of the first to fourth pulses is proportional to level change of the video signal at each of the edges; a PLL responsive to a horizontal synchronizing signal of the input video signal for generating a clock for displaying the video signal, the PLL (phase-locked loop circuit) having a VCO (voltage controlled oscillator), a LPF (low-pass filter) and a phase comparator; an adder provided between the LPF and the VCO for adding the each of the pulses to an output of the LPF to increase and decrease frequency of the clock, magnitude and duration of the first to second pulses being determined such that the number of pulses of the clock generated for a first total interval of the first and second intervals is substantially the same as the number of the clock which would be generated for the first total interval in the absence of the first and second pulses, magnitude and duration of the third to fourth pulses being determined such that the number of pulses of the clock generated for a second total interval of the third and fourth intervals is substantially the same as the number of the clock which would be generated for the second total interval in the absence of the third and fourth pulses, a time constant of the LPF being sufficiently larger than duration of each of the first to fourth pulses; and a display drive circuit responsive to the clock and and the input video signal for producing a display drive signal whose time base is controlled by the clock.

According to the present invention there is also provided a second edge enhancement apparatus for a video signal, comprising: an edge signal producing circuit responsive to an input video signal for succeedingly producing a first pulse of a given polarity having a first interval, a second pulse of the other polarity having a second interval, and a third pulse of the given polarity having a third interval in response to a leading edge of the input video signal and for succeedingly producing a fourth pulse of the given polarity having a third interval, a fifth pulse of the other polarity having a fifth interval, and sixth pulses of the given polarity having a sixth interval in response to a trailing edge of the input video signal such that magnitude of each of the first to sixth pulses is proportional to level change of the video signal at each of the edges; a PLL responsive to a horizontal synchronizing signal of the input video signal for generating a clock for displaying the video signal, the PLL having a VCO, a LPF, and a phase comparator; and an adder provided between the LPF and the VCO for adding the each of the pulses to an output of the LPF to increase and decrease frequency of the clock, magnitude and duration of the first to third pulses being determined such that the number of pulses of the clock generated for a first total interval of the first to third intervals is substantially the same as the number of the clock which would be generated for the first total interval in the absence of the first to third pulses, magnitude and duration of the third to fourth pulses being determined such that the number of pulses of the clock generated for a second total interval of the fourth to sixth intervals is substantially the same as the number of the clock which would be generated for the second total interval in the absence of the fourth to sixth pulses, a time constant of the LPF being sufficiently larger than duration of each of the first to sixth pulses; and a display drive circuit responsive to the clock and and the input video signal for producing a display drive signal whose time base is controlled by the clock.

According to the present invention there is further provided an edge enhancement apparatus, comprising, in addition to the first or second edge enhancement apparatus: a second PLL responsive to the horizontal synchronizing pulse for generating a second clock; and a buffer storage circuit responsive to the first and second clocks for storing and reading out the video signal whose time base is controlled by the first clock.

BRIEF DESCRIPTION OF THE DRAWINGS

The object and features of the present invention will become more readily apparent from the following detailed description taken in conjunction with the accompanying drawings in which.

The same or corresponding elements or parts are designated at like references throughout the drawings.

DETAILED DESCRIPTION OF THE INVENTION

Figure 1:
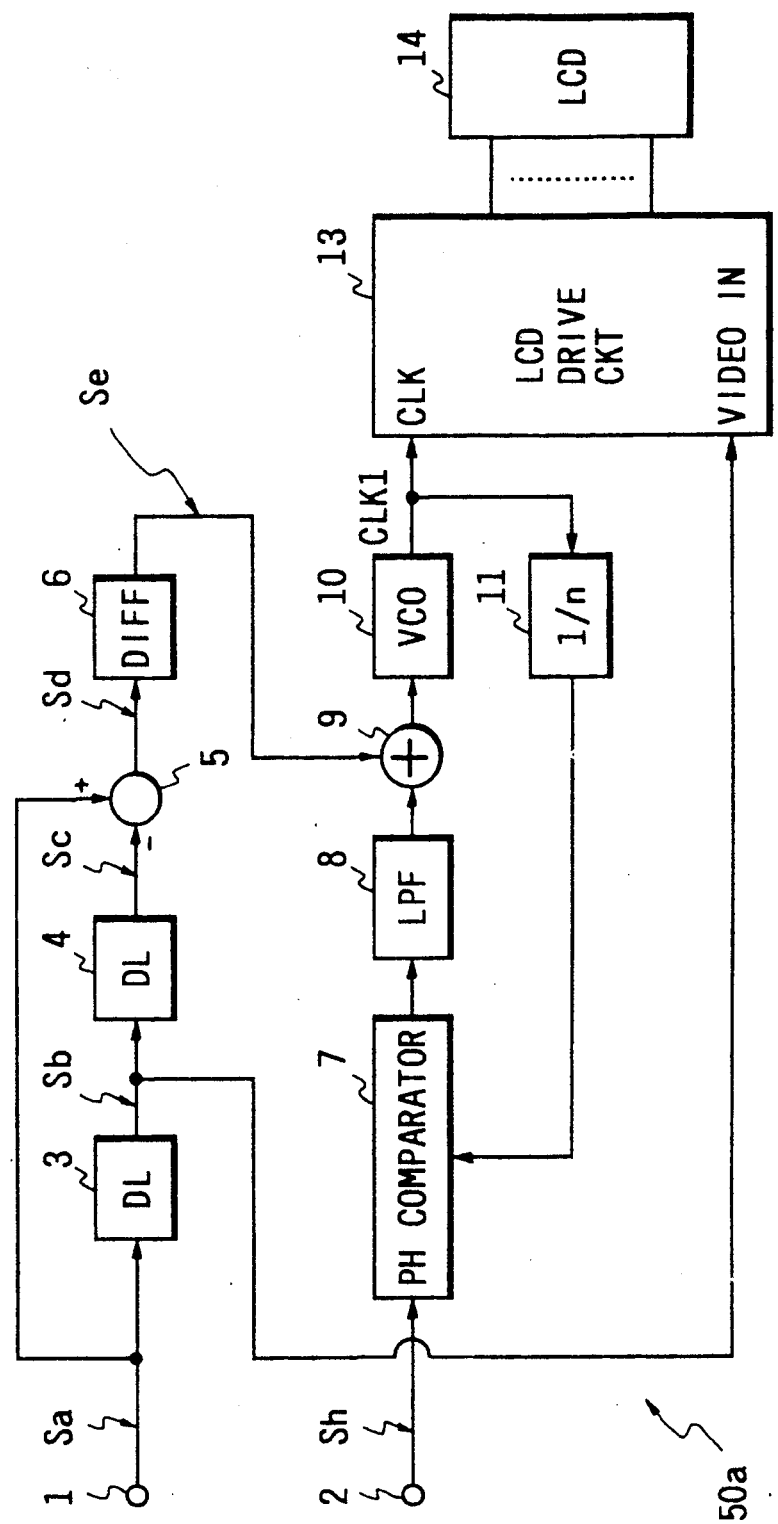
FIG. 1 is a block diagram of a first embodiment of edge enhancement apparatus of the invention.
Figure 2:
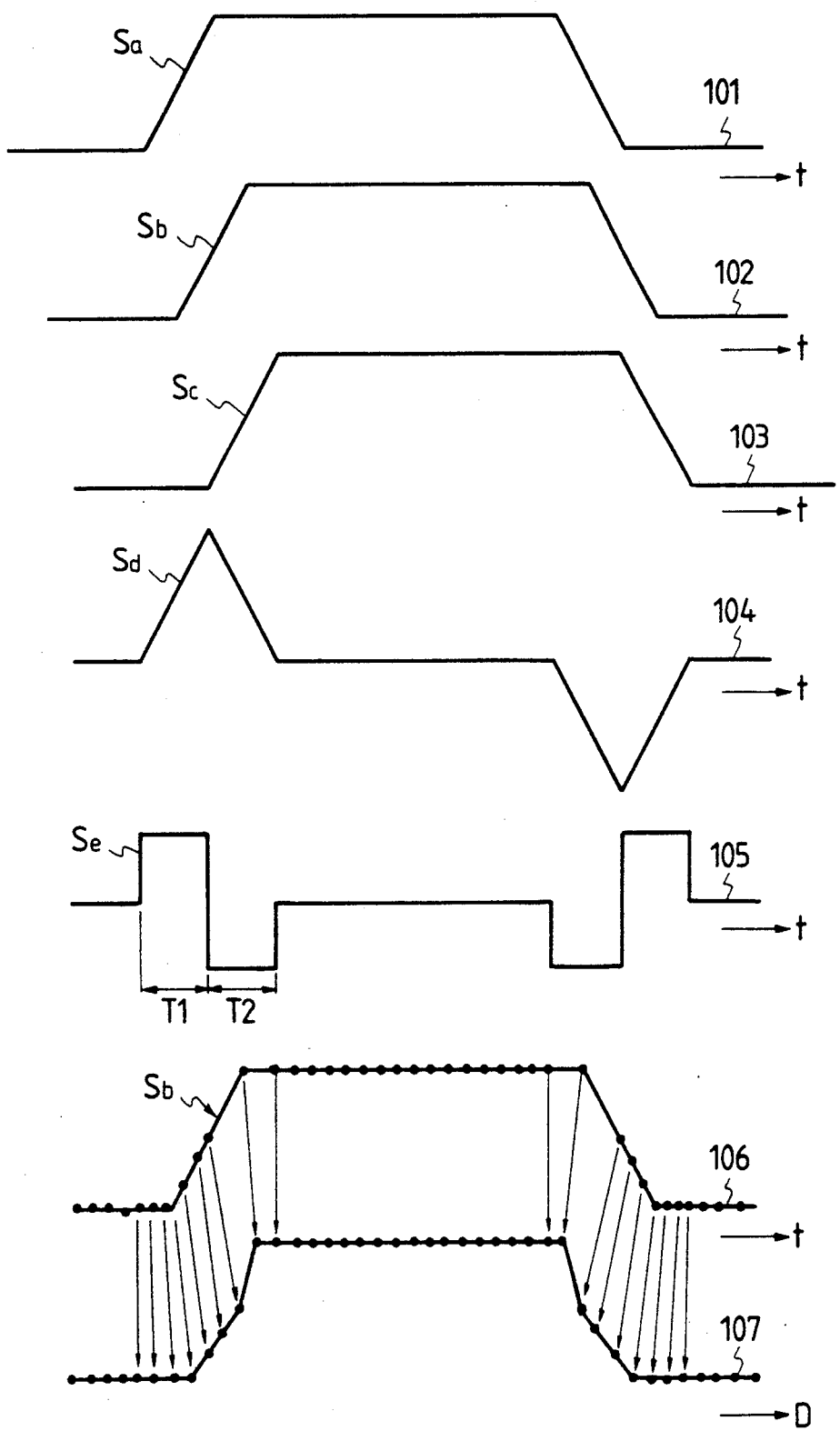
FIG. 2 shows waveforms of signals of the first embodiment.

Hereinbelow will be described a first embodiment of this invention with reference to drawings. FIG. 1 is a block diagram of a first embodiment of an edge enhancement apparatus of this invention. FIG. 2 shows waveforms at outputs of the edge enhancement apparatus shown in FIG. 1. In FIG. 1, an input video signal Sa is applied to a delay circuit 3 and also to a subtractor 5. The delay circuit 3 delays the video signal Sa by a given delay time DT. An output Sb of delay circuit 3 is sent to a delay circuit 4 for delaying the video signal Sb by the given delay time DT and also to a video input of an external liquid crystal display (LCD) drive circuit 13 as one output signal of this apparatus. Thus, the outputs Sb and Sc have delay with respect to the input video signal Sa, as shown in FIG. 2. An output Sc of the delay circuit 4 is sent to the subtractor 5. The subtractor 5 subtracts the output Sc of the delay 4 from the video signal Sa to produce a first-order differential signal Sd shown by an waveform 104 in FIG. 2. This difference signal Sd is obtained with respect to $\Delta t =$ delay time DT, i.e., not $\Delta t \to 0$. The differential signal Sd is supplied to a differentiating circuit 6 comprising a high-pass RC circuit. The differentiating circuit 6 produces a second-order differential signal Se shown by an waveform 105. The differentiating circuit 6 producing the differential signal Se with respect to $\Delta t \to 0$. That is, the differentiating circuit 6 is intended to perform an ideal differentiating.

The differential signal Se is sent to an adder 9 of a phase-lock loop (PLL) circuit 50a. The PLL circuit 50a produces a clock CLK 1 for driving a LCD 14 in response to a horizontal synchronizing signal Sh. The horizontal synchronizing signal Sh is applied to a phase comparator 7. An output of the phase comparator 7 is sent to the adder 9 through a low-pass filter 8. The adder 9 adds the differential signal Se to an output of the low-pass filter (LPF) 8. An output of the adder 9 is supplied to a voltage-controlled oscillator (VCO) 10 for producing the clock CLK 1 whose frequency is determined in accordance with its input level. The clock CLK 1 is sent to a divider for dividing pulses of the clock CLK 1 by "n" and also to the LCD drive circuit 13 as another output signal of this apparatus. The LCD drive circuit 13 produces a drive signal for the LCD 14. In order to prevent that the differential signal Se affects feedback loop of the PLL 50a, a time constant of the LPF 8 is selected to be sufficiently larger than duration of the differential signal Se.

The PLL circuit 50a produces the clock CLK 1 of a center frequency f1 determined by the number of pixels in the LCD 13 and repetition frequency of horizontal scanning. In the absence of the differential signal Se, the PLL circuit 50a produces the clock CLK 1 of the center frequency f1. In the presence of the differential signal Se, at leading edge of the input video signal, at first, the frequency of the PLL circuit 50a is increased from the center frequency f1 by a positive-going pulse of the differential signal Se during an interval T1. After the middle point of the leading edge of the output signal Sb, a negative-going pulse of the differential signal Se is developed so that the frequency of the PLL circuit 50a is decreased. In other words, the clock CLK 1 is frequency modulated in accordance with the differential signal Se. The number of the pulses generated by the output of the PLL circuit 50a for a total interval of T1 and T2 is equal to that would be in the of absence of the differential signal Se for the total interval. That is, the clock CLK 1 for the video output signal Sb is shifted in time base. Waveforms 106 and 107 show this time relation. The waveform 106 shows the delayed input video signal Sb marked by dots. Each dot indicates sampling points in the LCD 14. On the other hand, the waveform 107 shows level change over pixels of the LCD 14 along a row schematically, which is also marked by dots. Each dot indicates each of pixels of the LCD 14 which is equi-spaced. At the leading edge of the waveform 106, the frequency of the clock CLK 1 is increased at first. Thus, pulses of the clock CLK 1 are generated earlier than that would generated at flat image portion. However, the sampled signals are displayed at regular intervals on the LCD 14. Therefore, a slope at a edge portion on the LCD 14 is made steeper. In other words, in the LCD 14, a slope of level change of the video signal from shadow to gray level is made more flat by increasing the frequency of the clock CLK 1, on the other hand, a slope from gray to highlight is made steeper by decreasing the frequency of the clock CLK 1.

At a trailing edge of the input video signal, at first, the frequency of the PLL circuit 50a is decreased and then, increased, similarly. The number of the pulses generated by the PLL circuit 50a for a total interval of T1 and T2 is equal to that would be in the absence of the differential signal Se for the total interval. As the result, a slope of the trailing edge is made steep. Thus, edges of the video signal is enhanced.

Hereinbelow will be described a second embodiment of the edge enhancement apparatus of the invention.

Figure 3:
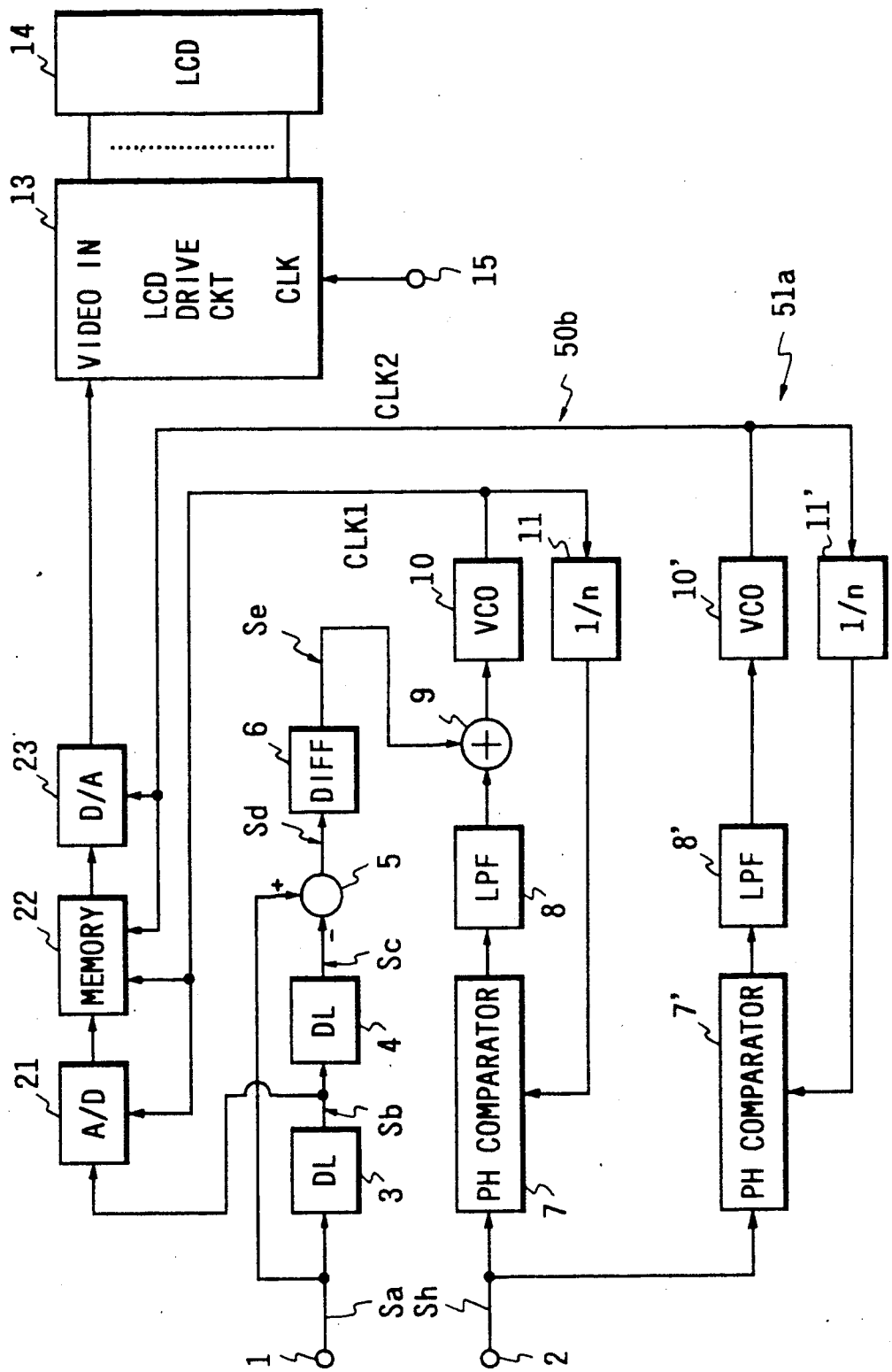
FIG. 3 is a block diagram of a second embodiment of edge enhancement apparatus.

FIG. 3 is a block diagram of the edge enhancement apparatus of the second embodiment of the invention. The basic structure of the second embodiment is the same as that of the first embodiment. There is difference that an A/D converter (A/D) 21, a memory 22, and a D/A converter (D/A) 23 are provided for outputting an edge-enhanced video signal without the time-shifted clock and are also provided another PLL circuit 51b for reading out the video signal stored in the memory 22. Thus, description of structure common to the first embodiment is omitted and different points are described mainly.

The delayed video signal Sb is sent to the A/D 21. An output of the A/D 21 is applied to the memory 22. The clock CLK 1 outputted from the VCO 10 whose frequency is controlled in accordance with edge detection of the video signal Sa is supplied to the A/D 21 and to the memory 22. Thus, the memory stores 22 the video signal Sb in response to the clock CLK 1 from the VCO 10. A read command signal input of the memory 22 is supplied with a second clock CLK 2 from a VCO 10' of a second PLL circuit 51a comprising a phase comparator 7', a low pass filter 8', the VCO 10', and a divider 11'. The second PLL circuit 51b responses to the synchronizing signal from the terminal 2. A frequency of the second PLL circuit 51b is equal to the center frequency f1 of the first PLL circuit 50b. Therefore, the memory 22 stores the delayed video signal Sb in response to the clock CLK 1 which is shifted in time base and outputs the video signal in response to the clock CLK 2 of constant intervals. In other words, the video signal Sb is edge-enhanced through time expansion and time compression. As the result, the video signal from the memory 22 is edge-enhanced. Actually, the memory 22 has two line memories for writing and reading data alternately to ensure to read data after writing. When one line memory is used for storing, another line memory is used for reading. Selection as to which line memory is used for writing can be made in response to the synchronizing pulse through an unshown T type flip flop. However, there are many technique to ensure reading a memory after storing. This is only an example. Further, the clock CLK 1 can be used for a reading command signal of the memory 22 and the clock CLK 2, for writing command signal. In other words, the memory 22 acts as a buffer storage. This is because the clock CLK 1 is used only for controlling time base of the video signal. The video signal from the memory 22 is sent to the LCD drive circuit 13 through a D/A converter 23. The LCD drive circuit 13 drives the LCD 14 to display the video signal from the D/A converter 23 in response to an external clock from a terminal 15.

The edge enhancement apparatus of the second embodiment is suited for the case that the clock for the LCD 14 is different from that used for edge enhancement. On the other hand, the apparatus of the first embodiment is suited for the case that the clock for the LCD 14 is the same as or equivalent to that used for edge enhancement.

Figure 4:
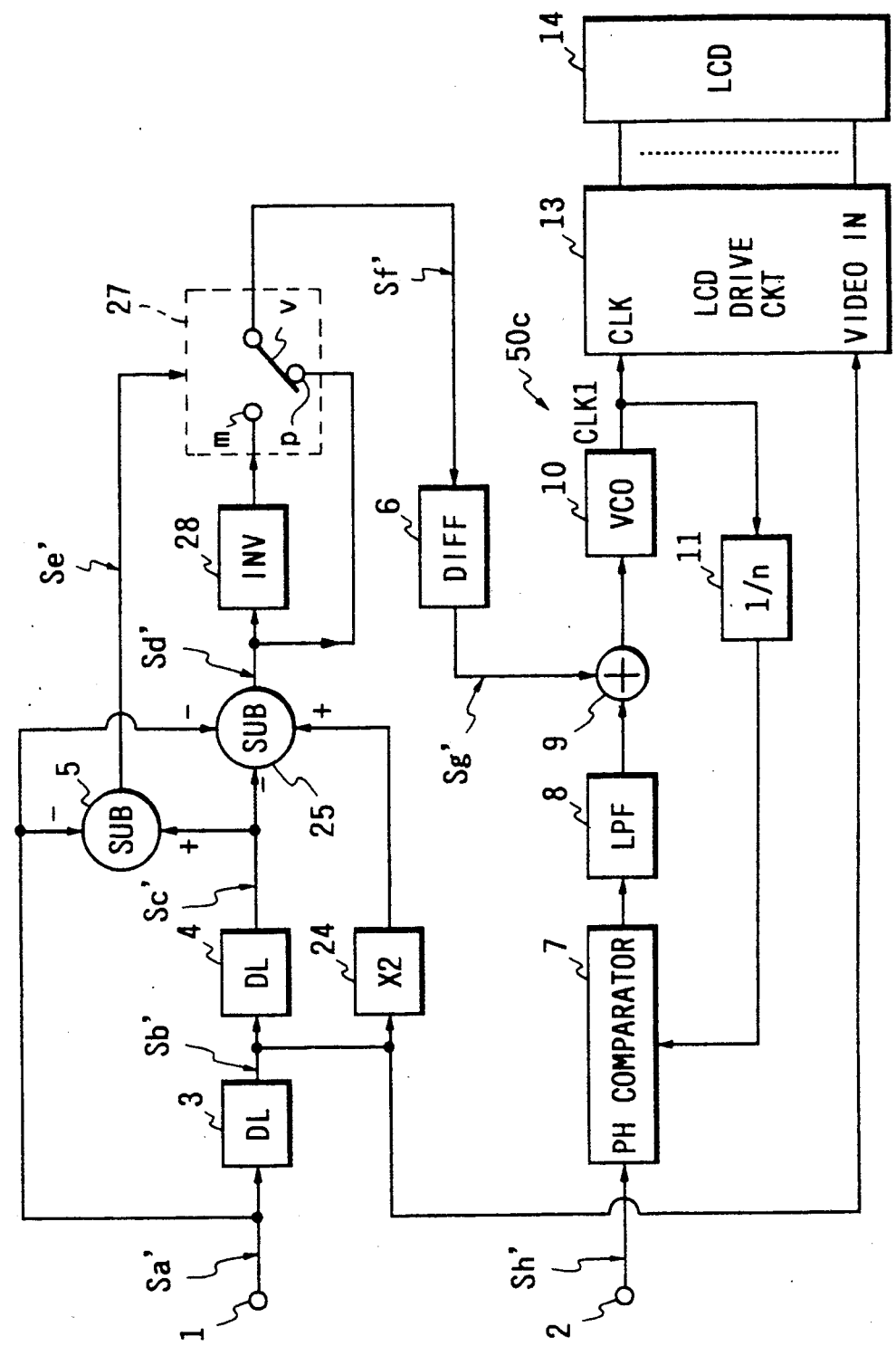
FIG. 4 is a block diagram of a third embodiment of edge enhancement apparatus.
Figure 5:
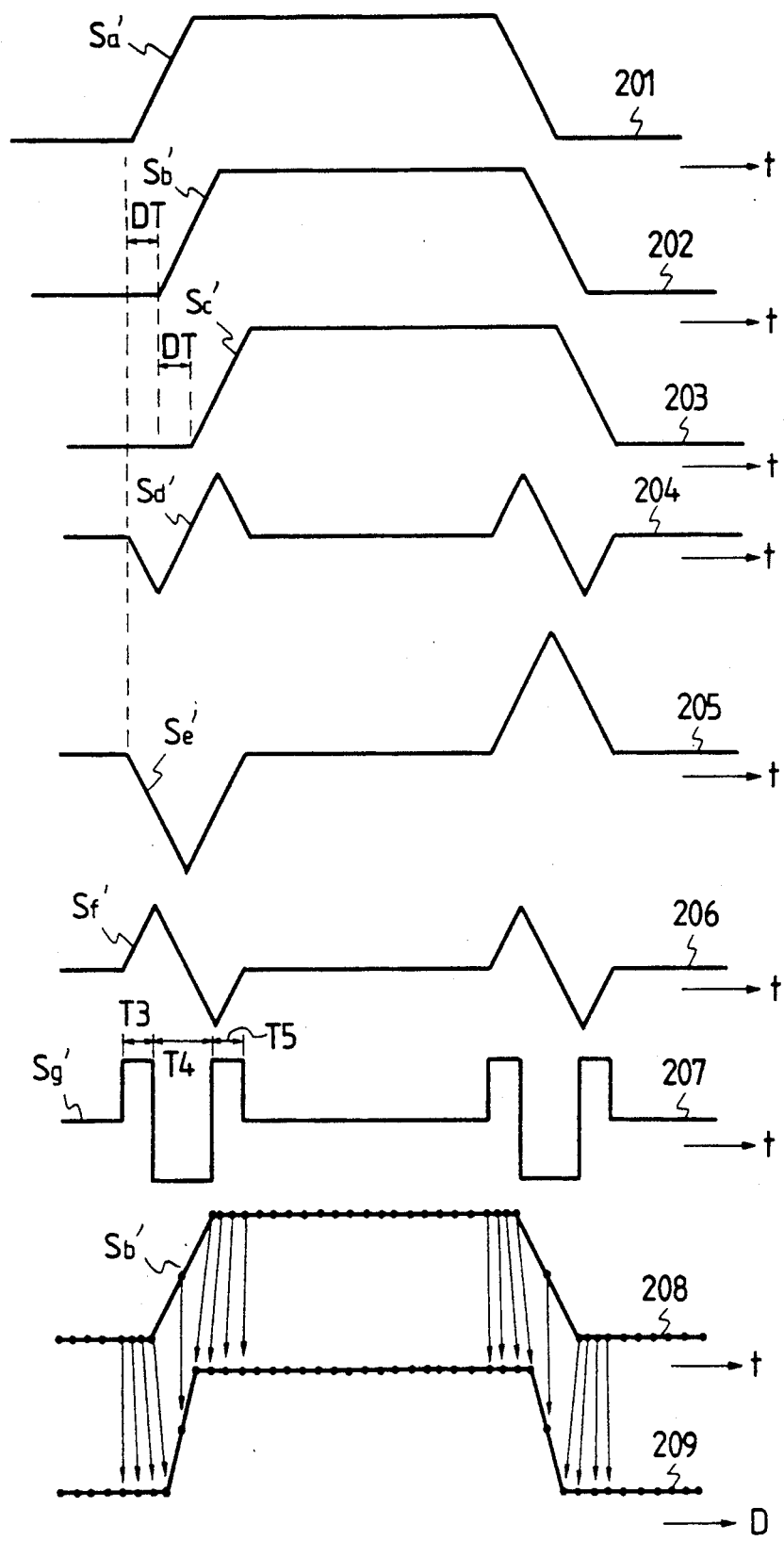
FIG. 5 shows waveforms of signals of the third embodiment.

Hereinbelow will be described a third embodiment of this invention with reference to drawings. FIG. 4 is a block diagram of an edge enhancement apparatus of this invention. FIG. 5 shows waveforms at outputs of the third embodiment shown in FIG. 4. In FIG. 4, an input video signal Sa' is applied to a delay circuit 3, to a subtractor 5, and to a subtractor 25. An output Sb' of delay circuit 3 is delayed by a given delay time DT and sent to a delay circuit 4 for delaying the output Sb' by delay time DT, to a coefficient circuit 24, and to a video input of an external LCD drive circuit 13 as a video output signal of this edge enhancement apparatus. Thus, the outputs Sb' and Sc' have delay with respect to the video signal Sa', as shown in FIG. 5. An output Sc' of the delay circuit 4 is sent to the subtractors 5 and 25. The subtractor 5 subtracts the video signal Sa' from the output Sc' to produce a first-order differential signal Se' shown by an waveform 205 in FIG. 5. The coefficient circuit 24 amplifies the output Sb' with a gain of two. An output of the coefficient circuit 24 is sent to the subtractor 25. The subtractor 25 subtracts the video signal Sa' and the output Sc' of the delay circuit 4 from the output of the coefficient circuit 24 to produce a second-order differential signal Sd' shown by an waveform 204 in FIG. 5. The circuit arrangement including the delays 3 and 4, the coefficient circuit 24, and the subtractor 25 forms a cosine filter. This difference signal Sd' is obtained with respect to $\Delta t$ ($=DT$). The differential signal Sd' is supplied to an inverting circuit 28 for inverting the differential signal Sd' and to a contact "p" of a switch 27. Another contact "m" is supplied with an output of the inverting circuit 28. The differential signal Se' is applied to the switch 27. The switch 27 outputs either the output signal of the inverting circuit 28 or the output signal of the differential signal Sd' in response to the differential signal Se'. The differential signal Se' indicates timing of edges of the video signals Sa', Sb', and Sc' and polarity of these video signals. The switch 27 transfers the output of the inverter, i.e., the inverted differential signal Sd' in response to a negative pulse of the differential signal Se', and it transfers the differential signal Sd' in response to a positive pulse of the differential signal Se', as shown by an waveform 206. An output Sf of the switch 27 is sent to a differentiating circuit 6 comprising a high-pass RC circuit. The differentiating circuit produces a third-order differential signal Sg' shown by an waveform 207. The differentiating circuit 6 produces the differential signal Se' with respect to $\Delta t \rightarrow 0$. That is, the differentiating circuit 6 is intended to perform an ideal differentiating.

The differential signal Sg' is sent to an adder 9 of a PLL circuit 50c. The PLL circuit 50c produces a clock CLK 1 for driving a LCD 14 in response to a horizontal synchronizing signal Sh'. The horizontal synchronizing signal Sh' is applied to a phase comparator 7. An output of the phase comparator 7 is sent to the adder 9 through a low-pass filter (LPF) 8. The adder 9 adds the differential signal Sg' to an output of the low-pass filter 8. An output of the adder 9 is supplied to a voltage controlled oscillator (VCO) 10 for producing the clock CLK 1 whose frequency is determined in accordance with its input level. An output of the VCO 10 is sent to a divider for dividing pulses of the output of the VCO 10 by n and also to the LCD drive circuit 13 as another output signal of this apparatus. The LCD drive circuit 13 produces a drive signal for the LCD 14.

The PLL circuit 50c produces the clock CLK 1 of a center frequency f1 determined by the elements of the LCD 13 and repetition frequency of horizontal scanning. In the absence of the differential signal Sg', the PLL circuit 50c produces the clock CLK 1 of the center frequency f1. In the presence of the differential signal Sg', at leading edge of the input video signal, at first, the frequency of the PLL circuit 50c is increased by a positive-going pulse of the differential signal Sg' during an interval T3. At the beginning of rising of video signal Sb', a negative-going pulse pulse of the differential signal Sg' is developed so that the frequency of the PLL circuit 50c is decreased. At the middle point of the leading edge of the video signal Sb', the frequency of the PLL circuit 50c consists with the frequency f1 once. Then, at the beginning of rising of video signal Sc', a positive-going pulse of the differential signal Sg' is developed so that the frequency of the PLL circuit 50c is increased again. In other words, the clock CLK is frequency modulated in accordance with the differential signal Sg'. The number of the pulses of the output of the PLL circuit 50c is equal to that would be in the absence of the differential signal Sg'. That is, the clock for the video output signal Sb' is shifted in time base. An waveforms 208 and 209 show this. The waveform 209 shows the delayed input video signal Sb' marked by dots. Each dot indicates a sampling point of the video signal Sb in the LCD 14. The waveform 209 shows level change on the LCD 14 schematically, which is also marked by dots. Each dot indicates a pixel of the LCD 14 along one row. The delayed video signal Sb' whose clock is shifted in time base is displayed on the LCD 14 as shown by the waveform 209 whose slope is steeper than that of the delayed video signal Sb'. This is because the pixels of the LCD 14 are equi-spaced although its clock is shifted in time base. As the result, a slope of the leading edge is made steep. At a trailing edge of the input video signal, at first, the frequency of the PLL circuit 50c is increased and then, decreased, finally increased. The number of the pulses of the output of the PLL circuit 50c is equal to that would be in the absence of the differential signal Sg'. As the result, a slope of the trailing edge is made steep.

Hereinbelow will be described a fourth embodiment of the edge enhancement apparatus of the invention.

Figure 6:
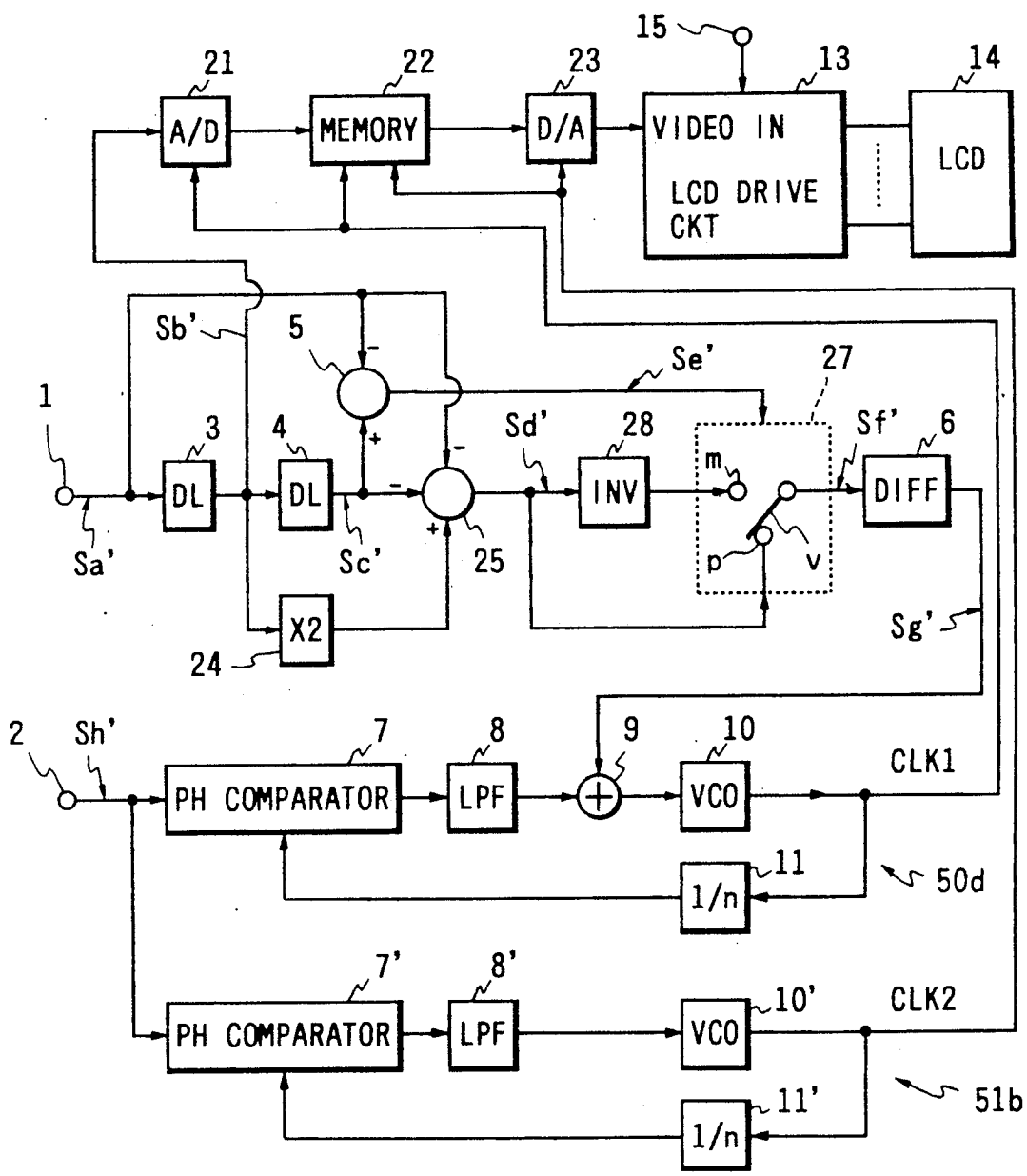
FIG. 6 is a block diagram of a fourth embodiment of edge enhancement apparatus.
Figure 7:
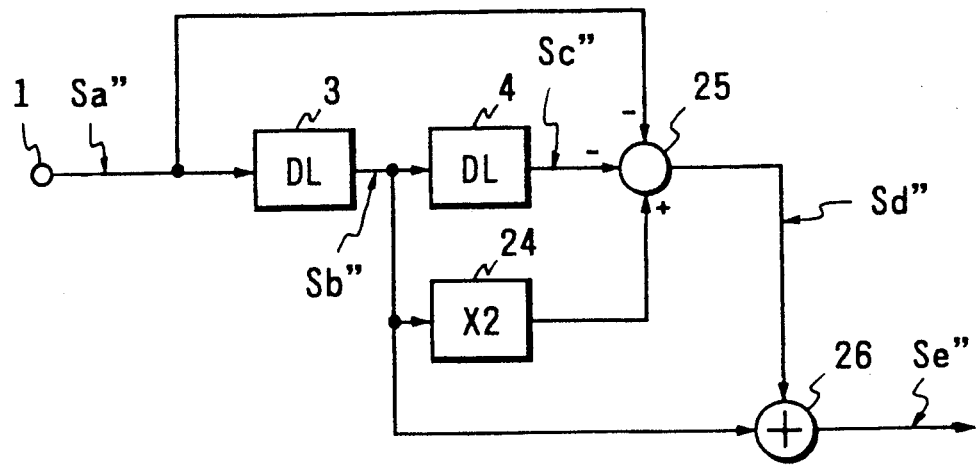
FIG. 7 is a block diagram of a prior art edge enhancement apparatus.
Figure 8:
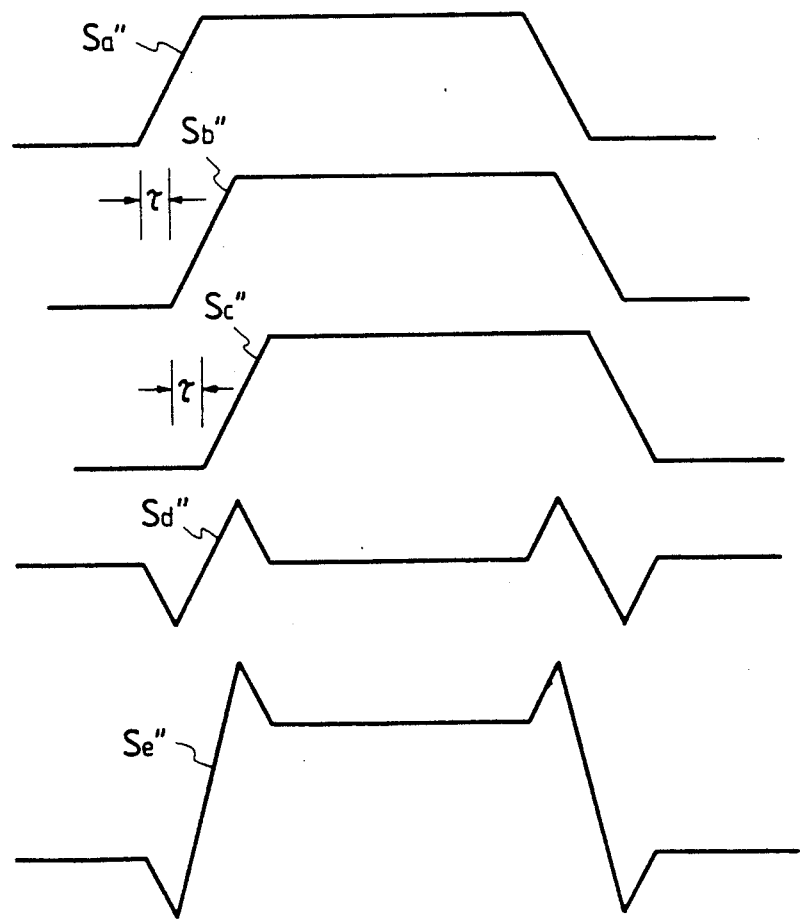
FIG. 8 shows waveforms of signals of a prior art edge enhancement apparatus.

FIG. 6 is a block diagram of the edge enhancement apparatus of the invention. The basic structure of the fourth embodiment is the same as that of the third embodiment. There is difference that an A/D 21, a memory 22, and a D/A 23 are provided for outputting an edge-enhanced video signal without the time-shifted clock and are also provided another PLL circuit 51b for reading out the video signal stored in the memory 22. Thus, structure common to that of the third embodiment is omitted and different points are described mainly.

The delayed video signal Sb' is sent to the A/D 21 also. An output of the A/D 21 is applied to the memory 22. The clock outputted from the VCO 10 whose frequency is controlled in accordance with edge detection of the video signal Sa' is supplied to the A/D 21 and to the memory 22. Thus, the memory 22 stores the video signal Sb' in response to the clock CLK 1 from the VCO 10. A read command signal input to the memory 22 is supplied with a second clock CLK 2 from a VCO 10' of a second PLL circuit 51b comprising a phase comparator 7', a low pass filter 8', the VCO 10', and a divider 11'. The second PLL circuit 51b responses to the synchronizing signal from the terminal 2. A frequency of the second PLL circuit 50b is equal to the center frequency f1 of the PLL circuit 50d. Therefore, the memory 22 stores the delayed video signal Sb' in response to the clock CLK 1 which is shifted in time base and outputs the video signal in response to the clock CLK 2 of constant intervals. As the result, the video signal from the memory 22 is edge-enhanced. Actually, the memory 22 has two line memories for writing and reading data alternately to ensure to read data after writing. One line memory used for storing can be determined in response to the synchronizing pulse through an unshown T type flip flop. The video signal from the memory 22 is sent to the LCD drive circuit 13 through a D/A converter 23. The LCD drive circuit 13 drives the LCD 14 to display the video signal from the D/A converter 23 in response to an external clock from a terminal 15.

The edge enhancement apparatus of the fourth embodiment is suited for the case that the clock for the LCD 14 is different from that used for edge enhancement. On the other hand, the apparatus of the first embodiment is suited for the case that the clock for the LCD 14 is the same as or equivalent to that used for edge enhancement.

What is claimed is:

1. An edge enhancement apparatus for a video signal comprising:
   (a) edge signal producing means responsive to an input video signal for producing a first pulse of a given polarity having a first interval and then, a second pulse of the other polarity having a second interval in response to a leading edge of said input video signal and for producing a third pulse of said given polarity having a third interval and then, a fourth pulse of said the other polarity having a fourth interval in response to a trailing edge of said input video signal such that magnitude of each of said first to fourth pulses is proportional to level change of said video signal at each of said edges;
   (b) phase-locked loop means responsive to a horizontal synchronizing signal of said input video signal for generating a clock for displaying said video signal, said phase-locked loop having a voltage-controlled oscillator, a low-pass filter, and a phase comparator;
   (c) an adder provided between said low-pass filter and said voltage-controlled oscillator for adding said each of said pulses to an output of said low-pass filter to increase and decrease frequency of said clock in response to a magnitude and a duration of said first to fourth pulses, said magnitude and duration of said first to second pulses being determined such that the number of pulses of said clock generated for a first total interval of said first and second intervals is substantially the same as the number of said clock which would be generated for said first total interval in the absence of said first and second pulses, said magnitude and duration of said third to fourth pulses being determined such that the number of pulses of said clock generated for a second total interval of said third and fourth intervals is substantially the same as the number of said clock which would be generated for said second total interval in the absence of said third and fourth pulses, a time constant of said low-pass filter being sufficiently larger than duration of each of said first to fourth pulses; and
   (d) display drive means responsive to said clock and and said input video signal for producing a display drive signal whose time base is controlled by said clock.

2. An edge enhancement apparatus for a video signal as claimed in claim 1, wherein said edge signal producing means comprises:
   (a) a first differentiator responsive to said input video signal for producing a first-order differential signal; and
   (b) a second differentiator for differentiating said first-order differential signal to produce said first to fourth pulses.

3. An edge enhancement apparatus for a video signal as claimed in claim 2, wherein said first differentiator comprises:
   (a) first delay means for delaying said input video signal for a given interval;
   (b) second delay means for delaying an output of said first delay means for said given interval; and
   (c) a subtractor responsive to said input video signal and an output of said second delay means for obtaining difference between said input video signal and said output of said second delay means.

4. An edge enhancement apparatus for a video signal as claimed in claim 2, wherein said second differentiator comprises a high-pass RC circuit.

5. An edge enhancement apparatus for a video signal as claimed in claim 1, further comprising:

(a) second phase-locked loop means responsive to said horizontal synchronizing pulse for generating a second clock; and (b) buffer storage means responsive to said first and second clocks for storing and reading out said video signal whose time base is controlled by said first clock.

6. An edge enhancement apparatus for a video signal, comprising:

(a) edge signal producing means responsive to an input video signal for succeedingly producing a first pulse of a given polarity having a first interval, a second pulse of the other polarity having a second interval, and a third pulse of said given polarity having a third interval in response to a leading edge of said input video signal and for succeedingly producing a fourth pulse of said given polarity having a third interval, a fifth pulse of said the other polarity having a fifth interval, and sixth pulses of said given polarity having a sixth interval in response to a trailing edge of said input video signal such that magnitude of each of said first to sixth pulses is proportional to level change of said video signal at each of said edges;

(b) phase-locked loop means responsive to a horizontal synchronizing signal of said input video signal for generating a clock for displaying said video signal, said phase-locked loop having a voltage-controlled oscillator, a low-pass filter, and a phase comparator; and (c) an adder provided between said low-pass filter and said voltage-controlled oscillator for adding said each of said pulses to an output of said low-pass filter to increase and decrease frequency of said clock in response to magnitude and duration of said first to third pulses and third to fourth pulses, said magnitude and duration of said first to third pulses being determined such that the number of pulses of said clock generated for a first total interval of said first to third intervals is substantially the same as the number of said clock which would be generated for said first total interval in the absence of said first to third pulses, said magnitude and duration of said third to fourth pulses being determined such that the number of pulses of said clock generated for a second total interval of said fourth to sixth intervals is substantially the same as the number of said clock which would be generated for said second total interval in the absence of said fourth to sixth pulses, a time constant of said low-pass filter being sufficiently larger than duration of each of said first to sixth pulses; and (d) display drive means responsive to said clock and and said input video signal for producing a display drive signal whose time base is controlled by said clock.

7. An edge enhancement apparatus for a video signal as claimed in claim 6, wherein said edge signal producing means comprises:

(a) a first differentiator responsive to said input video signal for producing a second-order differential signal;

(b) a second differentiator responsive to said input video signal for producing a first-order differential signal; and (c) inverting means for inverting an output of said first differentiator;

(d) switching means for outputting either output of said inverting means or an output of said first differentiator in response to an output of said second differentiator;

(e) a third differentiator for differentiating an output of said switching means to produce said first to sixth pulses.

8. An edge enhancement apparatus for a video signal as claimed in claim 7, wherein said first differentiator comprises:

(a) first delay means responsive to said input video signal for delaying said input video signal for a given interval;

(b) second delay means for delaying an output of said first delay means for said given interval; and (c) coefficient means for amplifying an output of said first delay means with a gain of two;

(c) a subtractor responsive to said input video signal, an output of said second delay means, and an output of said coefficient means for obtaining difference between an output of said amplifying means and a sum of said input video signal and said output of said second delay means.

9. An edge enhancement apparatus for a video signal as claimed in claim 7, wherein said second differentiator comprises:

(a) first delay means responsive to said input video signal for delaying said input video signal for a given interval;

(b) second delay means for delaying an output of said first delay means for said given interval; and (c) a subtractor responsive to said input video signal and an output of said second delay means for obtaining difference between said input video signal and said output of said second delay means.

10. An edge enhancement apparatus for a video signal as claimed in claim 7, wherein said third differentiator comprises a high-pass RC circuit.

11. An edge enhancement apparatus for a video signal as claimed in claim 6, further comprising:

(a) second phase-locked loop means responsive to said horizontal synchronizing pulse for generating a second clock; and (b) buffer storage means responsive to said first and second clocks for storing and reading out said video signal whose time base is controlled by said first clock.

* * * * *